July 14, 1925.

J. J. BARRY ET AL 1,545,631

ROTARY TOOL

Filed March 7, 1924     2 Sheets-Sheet 1

INVENTORS
James J. Barry
Horace H. Anthony
BY
Mason, Fenwick & Lawrence
ATTORNEYS July 14, 1925.  1,545,631
J. J. BARRY ET AL
ROTARY TOOL
Filed March 7, 1924  2 Sheets-Sheet 2

INVENTORS
James J. Barry
Horace H. Anthony
BY
Mason, Fenwick & Lawrence
ATTORNEYS Patented July 14, 1925.

1,545,631

UNITED STATES PATENT OFFICE.

JAMES J. BARRY, OF NEW YORK, N. Y., AND HORACE H. ANTHONY, OF JERSEY CITY, NEW JERSEY; SAID BARRY ASSIGNOR OF ONE-FOURTH TO WILLIAM T. GAMAGE, OF GLOUCESTER, MASSACHUSETTS.

ROTARY TOOL.

Application filed March 7, 1924. Serial No. 697,571.

*To all whom it may concern:*

Be it known that we, JAMES J. BARRY and HORACE H. ANTHONY, citizens of the United States, residing at New York, and Jersey City, in the counties of Bronx and Hudson and States of New York and New Jersey, have invented certain new and useful Improvements in Rotary Tools; and we do hereby declare the following to be a full, clear, and exact description of the invention, such as will enable others skilled in the art to which it appertains to make and use the same.

This invention relates to an improvement in rotary tools and more particularly to an integrally formed housing and handle, within which a tool carrying shaft is adapted to be mounted for rotation.

An object of the invention is to provide a suitable construction of housing within which a suitable bearing is disposed to rotatably support a removable sleeve upon which various different types of tools may be positioned.

Other objects will appear as the description proceeds.

In the accompanying drawings which form a part of our application,

Like characters of reference are used throughout the following specification and the accompanying drawings to designate corresponding parts.

Figure 1:
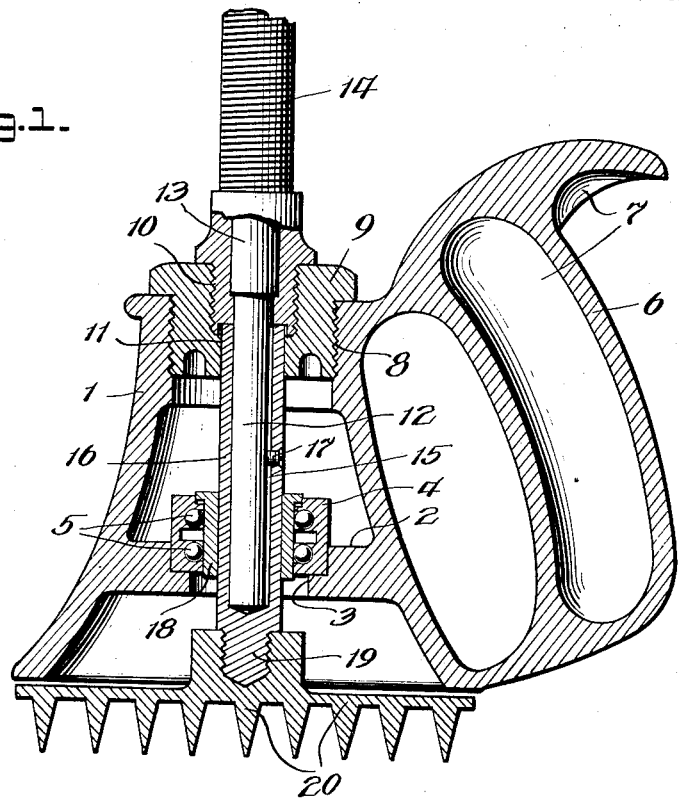
Figure 1 is a vertical sectional view through our improved rotary tool and housing therefor.
Figure 2:
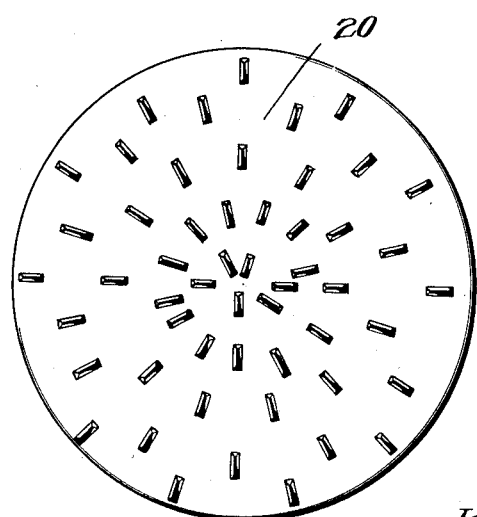
Figure 2 is a plan view of the tool illustrated in Figure 1.
Figure 3:
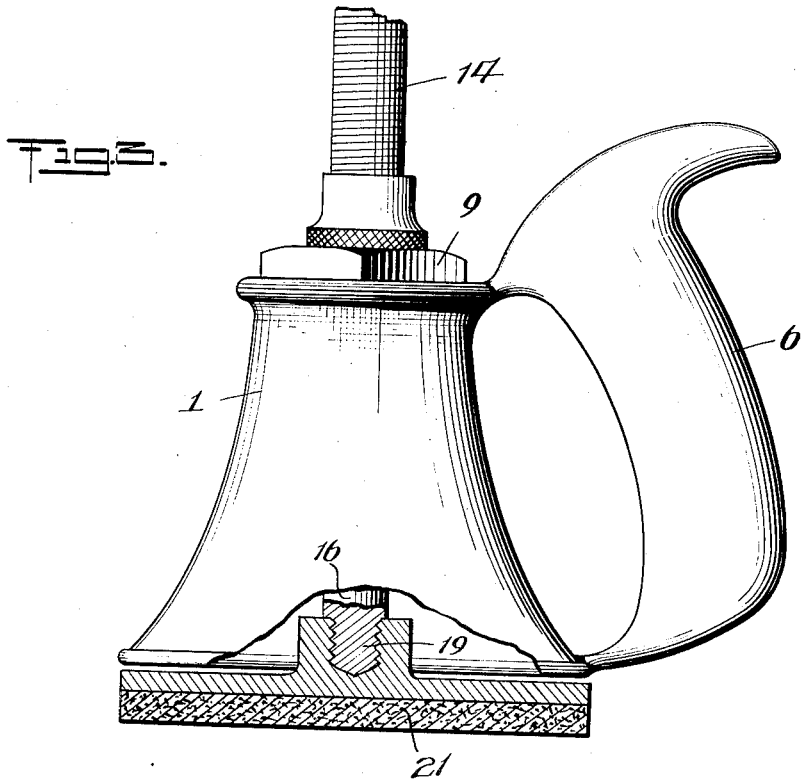
Figure 3 is a side elevation, partly in section, showing our improved housing with an abrading tool in position thereon.
Figure 4:
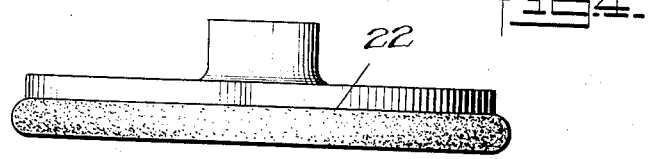
Figure 4 is a side elevation of a buffer tool which may be used with our invention.
Figure 5:
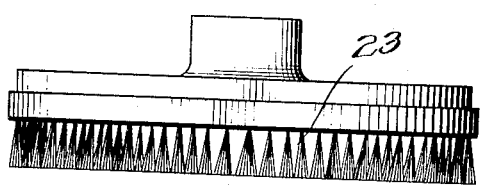
Figure 5 is a side elevation of the brush which may be used with our invention.

We provide a substantially cone shaped tool housing 1, which is hollow, and which is provided with a bridge formed transversely across its interior, which has formed through its center portion an opening 3 in which is mounted the ball bearing race 4 and ball bearings 5.

A handle 6 is formed integrally with the housing 1, and is recessed at 7 to give lightness to the implement.

The upper end of the housing 1 is interiorly threaded at 8 and is adapted to receive the exteriorly threaded bearing 9. This bearing is provided with a central threaded passage 10 and a reduced bearing surface 11. A flexible cable is adapted to be driven by a suitable motor and carries at its outer end the shaft 12 which is adapted to extend through the bushing 13 which is threaded into the centrally threaded passage 10 of the bearing 9. A suitable flexible cable housing 14 is adapted to encircle the flexible cable leading from the operating motor. The shaft 12 is provided with a slot 15, which extends a considerable distance of the length of the same.

An elongated sleeve 16 is adapted to slide over the shaft 12 and carries a set screw 17, which is adapted to be received within the slot 15 to couple the said shaft and sleeve together for rotation. A bearing collar 18 is positioned about the sleeve 16 and is disposed between the said sleeve and the ball bearings 5 in the race 4 to provide a bearing for the said sleeve. The lower end of the sleeve is provided with a threaded extension 19, on which may be threaded the pronged fish scaling tool 20 or the abrading tool 21, polishing tool 22, or rotary brush 23.

From the foregoing description it will be apparent that when the operating motor is started the tool carried at the lower end of the sleeve 16 will be rotated within the ball bearing race 4 in the housing 1. Furthermore, the sleeve 16 may readily be removed from the shaft 12 by pulling the same downwardly so that the set screw 17 will be withdrawn from the slot 15 in the said shaft 12. This will provide for the ready interchange of different tools by having each tool provided with or positioned on a separate sleeve, or the tools may be removed from the single sleeve in the apparatus and any desired tool placed thereon.

Many minor changes in detail of construction may be resorted to without departure from the spirit of the invention.

We claim:

A device of the character described, comprising a housing and handle formed thereon, a bearing positioned at the top of said housing, a bridge formed transversely across said housing and interiorly thereof, a ball bearing race supported by said bridge, a rotatable bearing collar supported within said ball bearing race, a sleeve having its lower end positioned within and supported by said bearing collar and its upper end rotatably mounted in said first mentioned bearing a tool on the lower end of the said sleeve, a rotatable shaft adapted to be positioned within said sleeve, said shaft being provided with an axially disposed slot and means carried by said sleeve for cooperating with said slot for transmitting motion from said shaft to said sleeve.

In testimony whereof we affix our signatures.

JAMES J. BARRY.
HORACE H. ANTHONY.